United States Patent
Fey, III et al.

(10) Patent No.: US 7,061,426 B1
(45) Date of Patent: Jun. 13, 2006

(54) EMBEDDED ELECTRONIC SECURITY SYSTEM

(75) Inventors: Charles Frederick Fey, III, Swedesboro, NJ (US); William H. Meise, Penns Park, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/928,986

(22) Filed: Aug. 27, 2004
(Under 37 CFR 1.47)

Related U.S. Application Data

(60) Provisional application No. 60/499,534, filed on Sep. 2, 2003.

(51) Int. Cl.
*G01S 5/02* (2006.01)
(52) U.S. Cl. .............................. 342/357.08; 342/357.13
(58) Field of Classification Search ........... 342/357.06, 342/357.08, 357.13, 419, 457; 701/213, 701/215
See application file for complete search history.

(56) References Cited

U.S. PATENT DOCUMENTS

| | | | | |
|---|---|---|---|---|
| 5,532,690 A | * | 7/1996 | Hertel | 340/989 |
| 5,936,526 A | * | 8/1999 | Klein | 340/571 |
| 5,961,571 A | * | 10/1999 | Gorr et al. | 701/207 |
| 6,154,658 A | | 11/2000 | Caci | 455/466 |
| 6,166,688 A | * | 12/2000 | Cromer et al. | 342/357.17 |

* cited by examiner

*Primary Examiner*—Dao L. Phan
(74) *Attorney, Agent, or Firm*—Duane Morris LLP

(57) ABSTRACT

A user-portable device determines its own geolocation, and compares that location with a region defined by at least one memorized specified location and a distance. A deviation or alarm signal is generated when either within or without the defined region. In one version, the memorized specified location is the geolocation of another, remote user-portable device.

10 Claims, 3 Drawing Sheets

EMBEDDED ELECTRONIC SECURITY SYSTEM

CROSS-REFERENCE TO RELATED APPLICATIONS

This application claims the benefit of the priority date of Provisional Application No. 60/499,534, filed Sep. 2, 2003.

FIELD OF THE INVENTION

This invention relates to geolocation (location) of user-portable devices, and to providing indications when a device is within or without a particular distance from a selected geolocation.

BACKGROUND OF THE INVENTION

The use of geolocation functions or devices, such as GPS receivers, on user-portable devices is well established. Such devices may be used by persons, such as backpackers or military personnel, who travel in remote areas, and they may be used in populated areas to aid emergency personnel in locating injured parties. In some contexts, the portable device may also include, or be associated with, communication devices such as voice, video, or data transceivers, cell-phones, biometric sensors, panic or distress actuators, and friend-or-foe indications. In some contexts, the user of such a portable device may want to avoid entering an area which is known to contain hostile combatants. This requires the user to be aware of the geolocation of the hostile forces, and to navigate with care to avoid the undesired areas. On the other hand, there may be situations in which the user of such a portable device may desire to perform scouting within a given region. Such activity requires that the user use his geolocator in conjunction with a map to navigate within the desired region.

Improved or alternative geolocation devices and methods are desired.

SUMMARY OF THE INVENTION

A user-portable device according to an aspect of the invention comprises a geolocation (location) device, such as a GPS receiver, for determining the location of the device, and for generating signals representing the location of the device. A memory is provided for storing signals representing at least one selected location, and also for storing signals representing a predefined distance, in at least one direction, from the selected location. A processor is coupled to the memory and to the geolocation device, for determining the deviation distance of the location of the device from the selected location, and for comparing the deviation distance with the predefined distance, and for generating a deviation signal when the deviation distance is one of greater and less than the predefined distance. In a preferred version of this aspect of the invention, the device further comprises a signal receiver coupled to the memory, for receiving from a remote location the signals representing the selected location(s), and also for receiving the signals representing the predefined distance(s), and for causing the signals representing the selected location and the signals representing the predefined distance to be stored in the memory. In one version, the deviation signal is generated when the deviation distance is greater than the predefined distance. In one version, the at least one direction includes all directions relative to the selected location, thereby defining the boundary as a sphere or circle. The deviation signal may be an alarm signal. The alarm may be presented to the user aurally, visually, or in a tactile manner, as by a vibration. In a preferred version of this aspect of the invention, the user-portable device includes an electromagnetic signal transmitter coupled to the processor, for transmitting the alarm signal to a remote location.

A method according an other aspect of the invention is for generating a deviation signal when a user-portable device crosses a boundary. This method comprises the step of, at the device, determining the device geolocation, and, also at the device, storing signals representing a selected geolocation, and a defined distance from the selected geolocation which determines a boundary. At the device, the device geolocation is processed with the selected geolocation and defined distance signals to determine whether the device lies one of within and without the boundary. At the device, a deviation signal is generated which is indicative if the device is one of within and without the boundary. The detection signal may trigger a local alarm. In one mode of the method, the deviation signal is transmitted from the device by way of an electromagnetic signal transmitter. In another mode of the method, electromagnetic signals are received at the device, where these received signals bear data representing the selected geolocation and the defined distance from a remote location in at least one direction. The selected geolocation and defined distance signals are stored within the device for use in the processing.

An other method according to an aspect of the invention is for generating a deviation signal when a user-portable first device is one of within and without a predefined distance of a user-portable second device. This other method comprises the steps of, at the first device, determining the geolocation of the first device, and generating signals representative thereof, and at the second device, determining the geolocation of the second device, and generating signals representative thereof. According to this other method, at the second device, electromagnetic signals are transmitted, where the electromagnetic signals include signals representative of the geolocation of the second device. At the first device, electromagnetic signals are received which represent the geolocation of the second device, and the signals representing the geolocation of the second device are stored in a memory of the first device. Signals representing the defined distance (and direction, if applicable) are also stored in memory at the first device. The defined distance, in conjunction with the geolocation of the second device, defines a boundary around the second device. At least the geolocation of the first device, the geolocation of the second device, and the signals representing the defined distance are processed at the first device, to determine whether the first device lies one of within and without the boundary. A deviation signal, indicative of the geolocation of the first device being one of within and without the boundary, is generated at at least one of the first and second devices. The determination of geolocation may be performed by the use of GPS. In a preferred mode of this other method, the step at the first device of storing in memory signals representing a defined distance includes the step of receiving, by way of electromagnetic transmissions from a remote location, the signals representing a defined distance. The deviation signal may be generated at the first device, the second device, or at both devices, and may be transmitted to a location remote from both devices. The deviation signal may be manifested aurally, visually, or in a tactile manner. In one especially advantageous version of this mode of the method, the deviation signal is generated when the first device is within the boundary about the second device.

A version of this other method may include, between the steps of (a) at the second device, transmitting electromagnetic signals including the signals representative of the geolocation of the second device and (b) at the first device, receiving electromagnetic signals representing the geolocation of the second device, and storing in a memory the signals representing the geolocation of the second device, the additional step of receiving at a third location, remote from both the geolocation of the first device and the geolocation of the second device, the electromagnetic signals from the second device, processing the content of the electromagnetic signals from the second device, and transmitting to the first device the electromagnetic signals representing the geolocation of the second device.

DESCRIPTION OF THE INVENTION

Figure 1:
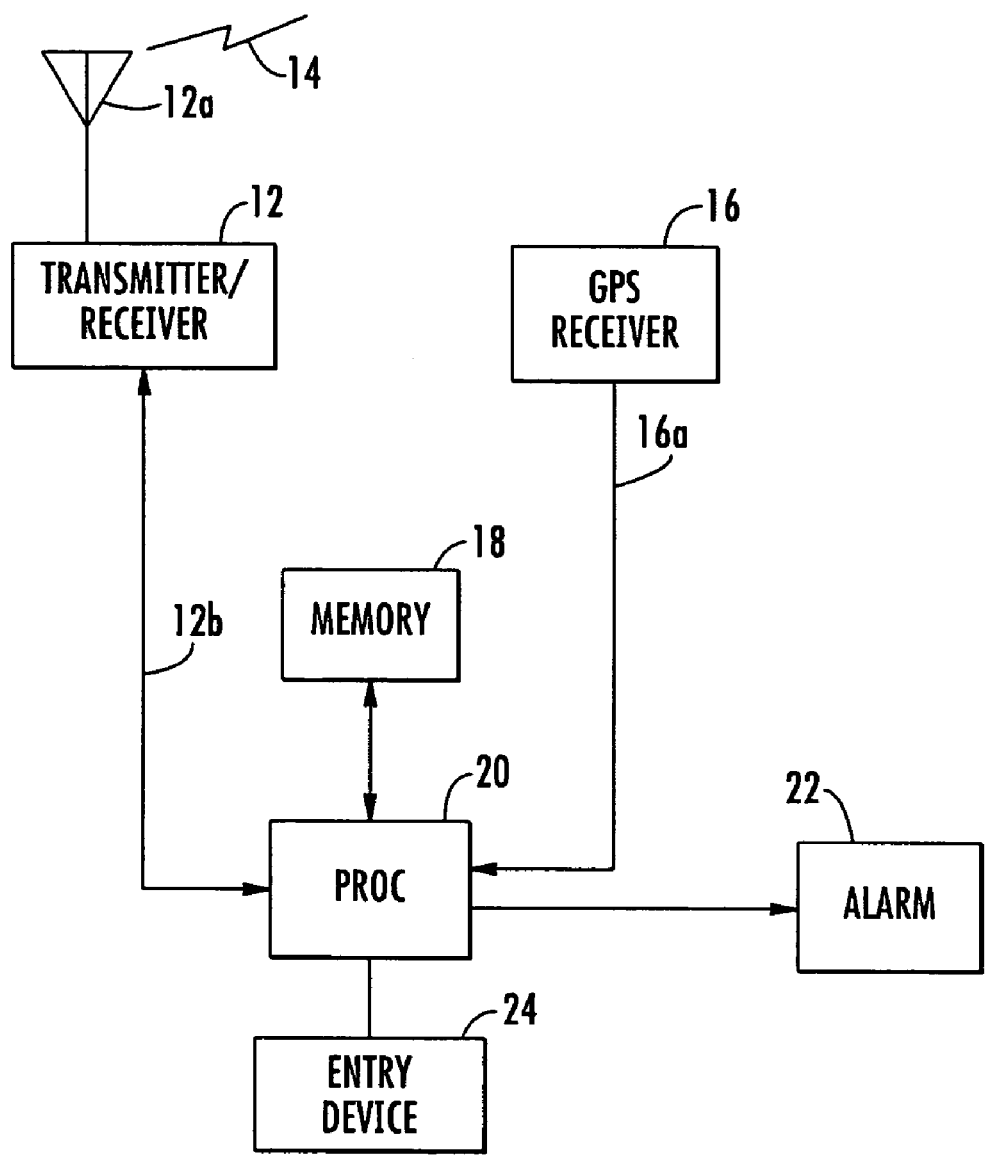
FIG. 1 is a simplified diagram of a user-portable device according to an aspect of the invention.

In the military context, the location of enemy combatants may not be known to an individual soldier, and is instead deduced from the available evidence at a headquarters location. According to an aspect of the invention, the portable device receives information from a remote location, such as the headquarters, defining a boundary which encloses either the soldier or the enemy combatants, and provides the soldier with a warning when he goes from one side of the border to the other side. FIG. 1 is a simplified block diagram of a portable device according to an aspect of the invention. In this context, the term portable means at least handheld by the user, or attached to the person or effects of the user. In some contexts, as where plural soldiers move together in a conveyance, the device may be supported by the conveyance at least part of the time. In other contexts, each soldier may have his own portable device. In FIG. 1, a user-portable device 10 includes a transmitter/receiver 12 with antenna 12a, which provides communications between the device 10 and remote locations by way of electromagnetic signals, represented by a "lightning bolt" symbol 14. Transmitter/receiver 12 may provide audio communications, and may also provide data communications. A Global Positioning System (GPS) 16 is provided for generating signals on a path 16a representing the geolocation or location of the device. GPS block 16 may have its own antenna(s) or make use of antenna 12a, or both. A memory 18 is associated with a processor 20. Processor 20 receives GPS signals from GPS receiver 16 by way of a path 16a, and also communicates with transmitter/receiver 12 by way of a path 12b. An alarm illustrated as a block 22 is connected to processor 20. User entry of data and commands is facilitated by an entry device 24, which may be, for example, a keyboard, mouse, or other equivalent.

Figure 2:
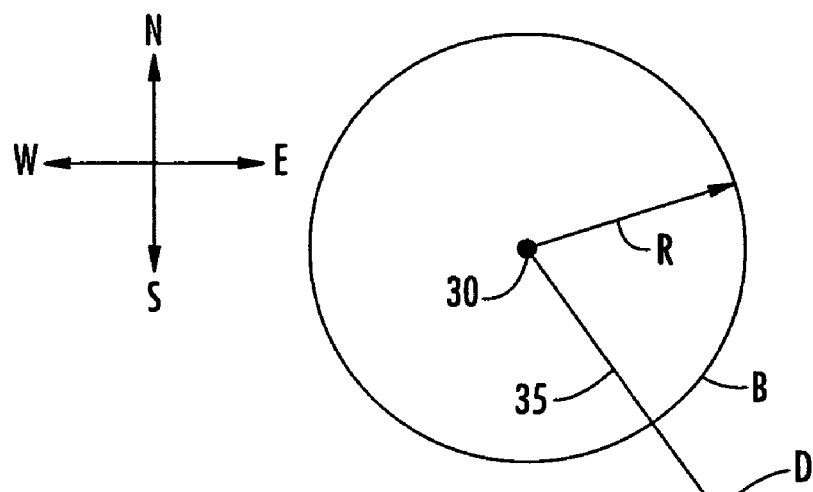
FIG. 2 is a simplified map illustrating a specified location and a boundary defined by a selected distance.

According to an aspect of the invention, memory 18 is preloaded with information relating to a specified geolocation, and is also preloaded with information relating to distance(s). FIG. 2 is a simplified map, with cardinal directions N, S, E, and W indicated. The specific geolocation information stored in memory 18 may be represented by location 30 of FIG. 2, and the distance information may be represented by the arrow designated R. It will be apparent that the single distance R, without any direction indication, defines a boundary circle B around specified location 30. The specific geolocation 30 and the radius R may be loaded into memory 18 by the user with which the device 10 is associated, based on his own observation of the environment, or based upon information received by way of the aural communication aspect of transmitter/receiver 12. Alternatively, the specific geolocation and distance information may be transmitted in data format from a remote location, such as a headquarters, and received by the transmitter/receiver 12, and processed by processor 20 for storage of the information in memory 18. Processor 20 of the device 10 of FIG. 1 compares the device geolocation, as indicated by the signals produced by GPS receiver 16, with the specific location 30 and radius R of FIG. 2, and determines whether the user's device 10 is within or without the boundary B.

Assuming that the geolocation of device 10 is indicated by GPS receiver 16 of FIG. 1 as being at a location D in FIG. 2, processor 20 of FIG. 1 can easily determine whether it is within or without the boundary B of FIG. 2 by generating or calculating a line, illustrated as 35, extending from predetermined location 30 to the geolocation D, and comparing the length of that line with the known length of line R. If line 35 exceeds the length of line R, then the geolocation of device 10 is outside of boundary B. If line 35 is shorter than the length of line R, then the geolocation of device 10 is within boundary B. In the context of a military operation, assuming that the enemy forces are deemed to be outside the boundary B, the user of portable device 10 may operate freely within boundary B. When the user of portable device 10 inadvertently wanders outside of the region bounded by boundary B, processor 20 of FIG. 1 generates a deviation signal indicative of the deviation outside of the desired region, and activates alarm 22 to alert the user to the situation, so that he can retreat back to the safety of the enemy-combatant-free region around location 30 of FIG. 2. Alarm 22 of FIG. 1 may include a variety of selectable alarm functions, such as visual by the use of flashing lights, aural by means of a buzzer, or in a tactile fashion by the use of a vibrator. If an aural alarm is used, it may be desirable to have the sound produced mimic the sound of some type of fauna in the region in question.

Figure 3:
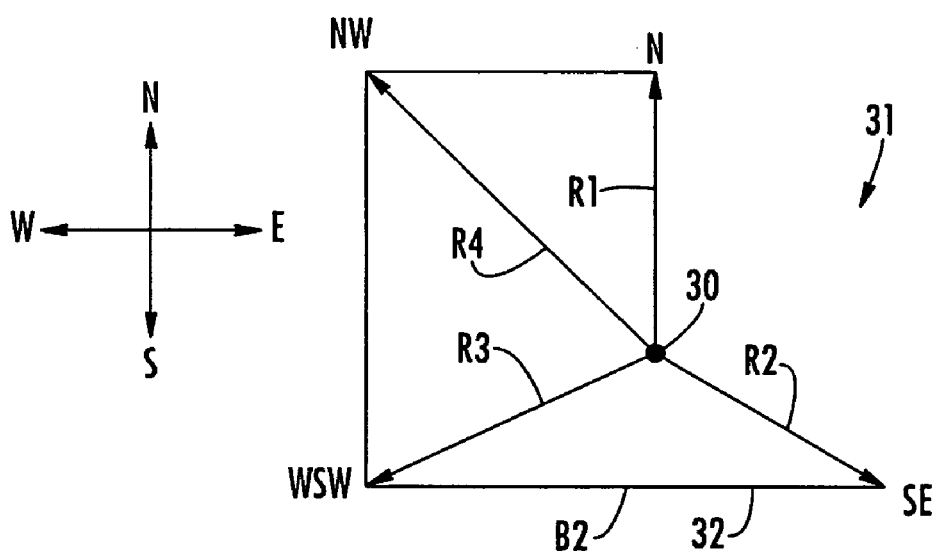
FIG. 3 is a simplified map illustrating a specified location and a boundary defined by a plurality of line segments.

The arrangement in one version as so far described has the advantage that the headquarters can address each of the portable units 10 with data, without the need for distracting the user from important other duties to enter into memory information on specific location and distance. Additionally, if all the soldiers in a given area are to receive the same information, the specific location and distance information may be broadcast to their portable devices rather than sent to each individual receiver address. The broadcast feature allows the relevant boundary information to be updated from the headquarters quickly without the need to sequentially address each individual user. In addition, there is no need to continue to poll the individual users from the headquarters to verify that they remain within the desired region, with the possibility that communications will be lost with one or more of the individual users at a critical moment, because the individual user's own portable device has stored in its memory the locations of interest, and can provide a warning when a boundary is crossed even if the headquarters is not at the time of the crossing in communication with the particular portable device. However, there may be situations in which the information to be entered into memory is so extensive that entry in the form of data is mandated. FIG. 3 is a simplified map similar to FIG. 2, but in which the boundary is more complex than a simple circle. In FIG. 3, the boundary B around location 30 is defined by four distances R1, R2, R3, and R4. The boundary B2 is defined by a circle portion 31 having radius R1 extending about location 30 from a North (N) direction to a Southeast (SE) direction. A second portion of boundary B2 is a straight-line section 32 defined by distance R2 in a Southeast (SE) direction and extending to a distance R3 in a West Southwest (WSW) direction. Similar definitions of straight line boundary portions 33 and 34 by means of distances R3 (WSW), R4 (NW) and R4 (WSW), R1 (N). Thus, a more complex boundary can be defined by the addition of more data. In fact, the boundaries can be defined in a complex fashion by specifying the geolocation of the origin of each vector and the length of each vector, and specifying the type of line section (circle or straight).

Of course, the device as described is also capable of providing a deviation signal or alarm when the region to be avoided is within the circle boundary B of FIG. 2 or the irregular boundary B2 of FIG. 3, rather than outside the boundary.

Figure 4:
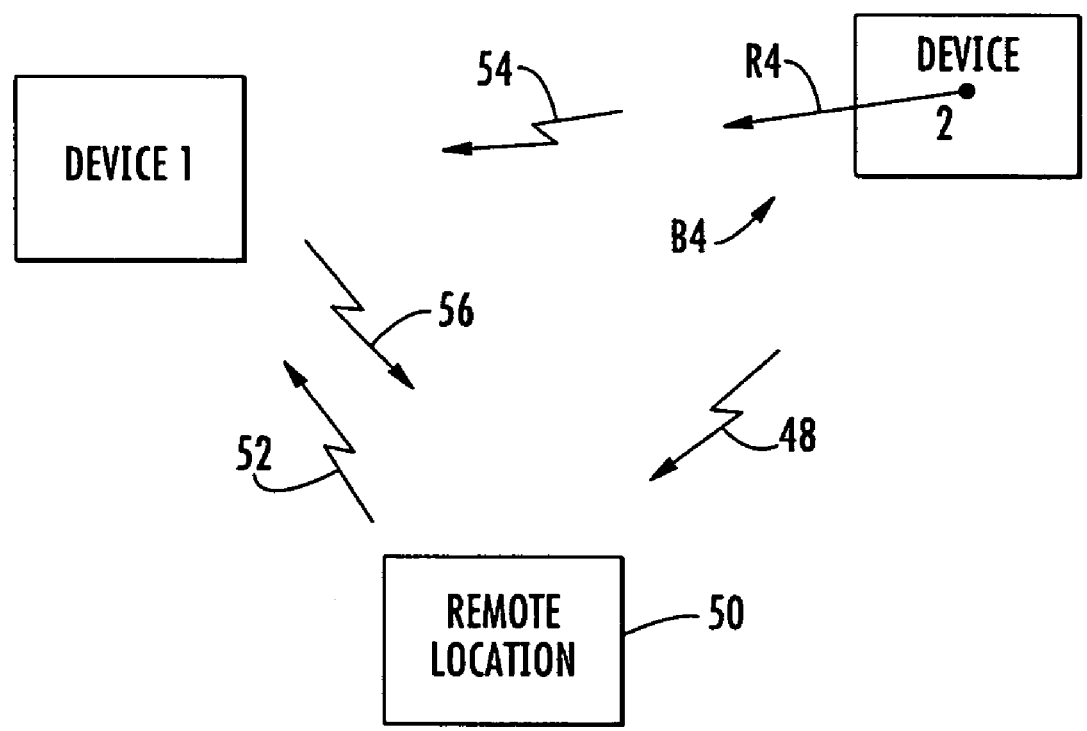
FIG. 4 represents a system including two user-portable devices corresponding to that of FIG. 1, and their relative locations.

In one advantageous aspect of the invention in which two portable devices such as 10 of FIG. 1 are used, the geolocation which is stored in the memory of the first portable device is the geolocation determined for itself by a second of the portable devices. More particularly, FIG. 4 illustrates a first device 1 and a second device 2, which is enclosed by a boundary B4 centered at a radius R4 from the geolocation of device 2. This arrangement might be advantageous in those instances in which a person is under court order not to come within a given distance of a potential victim. In such a situation, the person under the order might wear an anklet including a geolocation device and a transmitter/receiver, much as illustrated in FIG. 1, so that device 1 of FIG. 4 would be an anklet. In this instance, the person to be avoided or who is protected by court order also carries a portable device (device 2) which includes a geolocation device to generate signals indicative of the location of this second person, and a transmitter/receiver for transmitting the second person's geolocation. The transmission 48 from the second person (device 2) may be to a location which is, remote from both the first and second portable devices, as for example a court or police agency 50 of FIG. 4, which would then retransmit (52) the second device geolocation to the first device, possibly together with the court-ordered distance signal, although this distance will generally be unchanged over long periods of time and presumably would not often need to be updated. Additionally or as an alternative, the transmission of the geolocation of device 2, illustrated as 54 in FIG. 4, could be directly to device 1. In either case, device 1 stores the geolocation of device 2 in its memory (18 of FIG. 1). In normal operation, device 1 continuously compares the geolocation of device 1 with the geolocation of device 2 which is stored in its memory, and processes the information together with the memorized court-imposed distance R4, to determine or verify that device 1 is not within the court-imposed distance R4 of device 2. In this instance, the deviation or alarm signal is generated when device 1 enters within the boundary B4 of FIG. 4, so that device 2 is at a distance less than the court-ordered distance R4. All this assumes, of course, that the user-portable devices are in fact associated with their users.

When the person bearing the first device 1 of FIG. 4 enters the protected space defined by the location 2 and distance R4, the first device may alarm to indicate to the carrier of the device 1 that he is violating the court order. The alarm information may also be transmitted to officials at the remote location 50 to give warning of the same fact, so that an investigation may be instigated, or so that protective measures for the protected individuals may be taken. The alarm information generated by user device 1 may also be transmitted, either directly or by way of remote location 50, to the protected person, so that their own portable device may sound a warning that the court order is being violated, and that they may have to take measures for their own protection.

Other embodiments of the invention will be apparent to those skilled in the art. For example, the explanation of the operation of the device and method has assumed that the topology of the region in question is flat, but the same principles may be used in an area which is hilly or mountainous, or in an urban area having buildings extending in a third dimension above a planar region, as the calculations of distances and boundaries in three dimensions rather than two dimensions are well known to those skilled in the art. While Global Positioning System (GPS) has been described as the method for geolocation, other methods, such as LORAN, are possible. As mentioned, the distance information may be accompanied by direction information andor cardinal direction information in some cases; almost any shape boundary can be defined by 360 or more vectors, each of different length and direction.

Thus, a user-portable device (10) according to an aspect of the invention comprises a geolocation (location) device (16), such as a GPS receiver, for determining the location of the device (10), and for generating signals representing the location (D) of the device (10). A memory (18) is provided for storing signals representing a selected location (30), and also for storing signals representing a predefined distance (R), in at least one direction, from the selected location (30). A processor (20) is coupled to the memory (1.8) and to the geolocation device (16), for determining the deviation distance (35) of the location (D) of the device (10) from the selected location (30), and for comparing the deviation distance (35) with the predefined distance (R), and for generating a deviation signal when the deviation distance (35) is one of greater and less than the predefined distance (R). In a preferred version of this aspect of the invention, the device (10) further comprises a signal receiver (part of 12) coupled to the memory (18), for receiving from a remote location the signals representing the selected location (30), and also for receiving the signals representing the predefined distance (R), and for causing the signals representing the selected location (30) and the signals representing the predefined distance (R) to be stored in the local memory (18). In one version, the deviation signal is generated when the deviation distance (35) is greater than the predefined distance (R). In one version (FIG. 2), the at least one direction includes all directions in a plane including the selected location (30), thereby defining the boundary (B) as a circle. The deviation signal may be manifested as an alarm signal. The deviation signal or alarm may be presented to the user aurally, visually, or in a tactile manner, as by a vibration. In a preferred version of this aspect of the invention, the user-portable device (10) includes an electromagnetic signal transmitter (part of 12) coupled to the processor (20), for transmitting the alarm signal to a remote location.

A method according an other aspect of the invention is for generating a deviation signal when a user-portable device crosses a boundary or is within or without the boundary. This method comprises the step of, at the device (1), determining the geolocation, and, also at the device (1), storing signals representing a selected geolocation (location 2) and a defined distance (R4) from the selected geolocation (location 2) which determines a boundary (B4). At the device (1), the own- or self-geolocation is processed with the selected geolocation (location 2) and defined distance (R4) signals to determine whether the device (1) lies one of within and without the boundary (B4). At the device (1), a deviation signal is generated which is indicative if the device (1) is one of within and without the boundary (B4). In one mode of the method, the deviation signal is transmitted (48, 54) from the device (location 2) by way of an electromagnetic signal transmitter. In another mode of the method, electromagnetic signals (52, 54) are received at the device (location 1) from a remote location (50), where these received signals bear information relating to the selected geolocation (location 2) and the defined distance (R4). The selected geolocation (location 2) and defined distance (R4) signals are stored within the device (1) for use in the processing.

An other method according to an aspect of the invention is for generating a deviation signal when a user-portable first device (1) is one of within and without a predefined distance (R4) of a user-portable second device (2). This other method comprises the steps of, at the first device (1), determining the geolocation of the first device (1), and generating signals representative thereof, and at the second device (2), determining the geolocation of the second device (2), and generating signals representative thereof. According to this other method, at the second device (2), electromagnetic signals are transmitted 48, 54), where the electromagnetic signals include the signals representative of the geolocation of the second device (2). At the first device (1), electromagnetic signals are received (52, 54) which represent the geolocation of the second device (2), and the signals representing the geolocation of the second device (2) are stored in a memory (18) of the first device (1). Signals representing the defined distance (R4) are stored in memory (18) at the first device (1). The defined distance (R4), in conjunction with the geolocation of the second device (2), define a boundary (B4) around the second device (2). The signals representing a defined distance (R4) are stored in a memory (18) at the first device. The geolocation of the first device (1), the geolocation of the second device (2), and the signals representing the defined distance (R4) are processed at the first device (1), to determine whether the first device (1) lies one of within and without the boundary (B4). A deviation signal, indicative of the geolocation of the first device (1) being one of within and without the boundary, is generated at at least one of the first (1) and second (2) devices. The determination of geolocation may be performed by the use of GPS. In a preferred mode of this other method, the step at the first device (1) of storing in memory (18) signals representing a defined distance (R4) includes the step of receiving, by way of electromagnetic transmissions (52) from a remote location (50), the signals representing a defined distance (R4). The deviation signal may be generated at the first device (1), the second device (2), or both devices, and may be transmitted (56) to a location (50) remote from both devices. The deviation signal may be manifested aurally, visually, or in a tactile manner. In one especially advantageous version of this mode of the method, the deviation signal is generated when the first device (1) is within the boundary (B4) about the second device (2).

A version of this other method may include, between the steps of (a) at the second device (2), transmitting electromagnetic signals (48, 54) including the signals representative of the geolocation of the second device (2) and (b) at the first device (1), receiving electromagnetic signals (52, 54) representing the geolocation of the second device (2), and storing in a memory (18) the signals representing the geolocation of the second device (2), the additional step of receiving at a third location (50), remote from both the geolocation of the first device (1) and the geolocation of the second device (2), the electromagnetic signals (48) from the second device (2), processing the content of the electromagnetic signals (48) from the second device (2), and transmitting (52) to the first device (1) the electromagnetic signals (52) representing the geolocation of the second device (2).

What is claimed is:

1. A method for generating a deviation signal when a user-portable device crosses a boundary, said method comprising the steps of:
   at said device, determining the geolocation;
   at said device, storing signals representing a selected geolocation and a defined distance from said selected geolocation, which determines a boundary;
   at said device, processing at least said geolocation, selected geolocation, and defined distance signals to determine whether said device lies one of within and without said boundary; and
   at said device, generating a deviation signal indicative if said device is one of within and without said boundary;
   further comprising the step of transmitting said deviation signal from said device by way an electromagnetic signal transmitter.

2. A method for generating a deviation signal when a user-portable first device is one of within and without a predefined distance of a user-portable second device, said method comprising the steps of:
   at said first device, determining the geolocation of said first device, and generating signals representative thereof;
   at said second device, determining the geolocation of said second device, and generating signals representative thereof;
   at said second device, transmitting electromagnetic signals including said signals representative of said geolocation of said second device;
   at said first device, receiving electromagnetic signals representing said geolocation of said second device, and storing in a memory said signals representing said geolocation of said second device;
   at said first device, storing in a memory signals representing a defined distance which, when combined with said geolocation of said second device, determines a boundary about said second device;
   at said first device, processing said geolocation of said first device, said geolocation of said second device, and said signals representing a defined distance, to determine whether said first device lies one of within and without said boundary; and
   at at least one of said first and second devices, generating a deviation signal indicative of the geolocation of said first device being one of within and without said boundary.

3. A method according to claim 2, wherein said step of at said first device, storing in a memory signals representing a defined distance, includes the step of receiving, by way of electromagnetic transmissions from a remote location, said signals representing a defined distance.

4. A method according to claim 2, further comprising, between said steps of (a) at said second device, transmitting electromagnetic signals including said signals representative of said geolocation of said second device and (b) at said first device, receiving electromagnetic signals representing said geolocation of said second device, and storing in a memory said signals representing said geolocation of said second device, the additional step of receiving at a third location, remote from both said geolocation of said first device and said geolocation of said second device, said electromagnetic signals from said second device, processing the content of said electromagnetic signals from said second device, and transmitting to said first device said electromagnetic signals representing said geolocation of said second device.

5. A method according to claim 2, wherein said steps of (a) at said first device, determining the geolocation of said first device, and generating signals representative thereof and (b) at said second device, determining the geolocation of said second device, and generating signals representative thereof comprise the step of determining geolocation by means of GPS.

6. A method according to claim 2, wherein said deviation signal is generated when said first device is within said boundary.

7. A method according to claim 6, wherein said deviation signal is generated at said first device.

8. A method according to claim 7, wherein said deviation signal is manifested as one of an aural and a tactile signal.

9. A method according to claim 6, wherein said deviation signal is generated at said second device.

10. A method according to claim 9, wherein said deviation signal is manifested as one of an aural and a tactile signal.

* * * * *